US011318690B2

(12) United States Patent
Rauh et al.

(10) Patent No.: US 11,318,690 B2
(45) Date of Patent: May 3, 2022

(54) PROCESS FOR NANOSTRUCTURING CARBON FIBERS EMBEDDED IN FRPS BASED ON THE USE OF SULPHUR IN COMBINATION WITH AROMATIC HYDROCARBON GROUPS AND ON THE USE OF LASER RADIATION

(71) Applicant: Airbus Defence and Space GmbH, Taufkirchen (DE)

(72) Inventors: Benedikt Rauh, Munich (DE); Maximilian Kolb, Höhenkirchen-Siegertsbrunn (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 450 days.

(21) Appl. No.: 16/552,105

(22) Filed: Aug. 27, 2019

(65) Prior Publication Data
US 2020/0070449 A1 Mar. 5, 2020

(30) Foreign Application Priority Data
Aug. 31, 2018 (DE) .................... 10 2018 214 834.1

(51) Int. Cl.
*B29C 73/12* (2006.01)
*B82Y 40/00* (2011.01)
(Continued)

(52) U.S. Cl.
CPC ............. *B29C 73/12* (2013.01); *B29C 33/40* (2013.01); *B32B 5/26* (2013.01); *B82Y 40/00* (2013.01); *B29C 2791/009* (2013.01)

(58) Field of Classification Search
CPC . B29B 13/08; B29B 15/08; B29C 2035/0838; B29C 2035/0877;
(Continued)

(56) References Cited

U.S. PATENT DOCUMENTS 3,312,569 A * 4/1967 Philipps ..................... C08J 5/08
428/378
4,018,964 A * 4/1977 Otouma ................ C03B 37/022
428/399
(Continued)

FOREIGN PATENT DOCUMENTS

CN 110871566 A 3/2020
DE 102011 014017 A1 9/2012
(Continued)

OTHER PUBLICATIONS

He et al., "Controlled Interphase in Carbon Fiber/Epoxy Composites by Molecular Self-assembly Method," Key Engineering Materials, vol. 313, pp. 121-128 (2006).
(Continued)

*Primary Examiner* — Philip C Tucker
*Assistant Examiner* — Brian R Slawski
(74) *Attorney, Agent, or Firm* — Jenkins, Wilson, Taylor & Hunt, P.A.

(57) ABSTRACT

A process for the nanostructuring of fibers in fiber-composite plastics, where a sulfur-containing nanostructure is formed. Also, a plastics matrix with such nanostructured fibers is disclosed, and also a process for the repair of fibers in a fiber-composite plastic.

7 Claims, 8 Drawing Sheets

(51) Int. Cl.
*B32B 5/26* (2006.01)
*B29C 33/40* (2006.01)

(58) Field of Classification Search
CPC ...... B29C 2035/0883; B29C 2059/023; B29C 2059/145; B29C 2791/009; B29C 33/40; B29C 59/10; B29C 59/14; B29C 59/16; B29C 73/12; B29C 73/24; B29C 66/028; B29C 66/721; B29C 66/7212; B29C 66/74; B29C 66/7465; B29C 66/7444; B29C 66/742; B29C 66/87; B29C 71/04; B29K 2105/06; B32B 5/26; B82Y 40/00; C08J 5/005
USPC .... 156/60, 94, 98, 272.2, 272.6, 272.8, 153; 428/327, 113, 300.1, 367, 378, 379, 392
See application file for complete search history.

(56) References Cited

U.S. PATENT DOCUMENTS

| | | | |
|---|---|---|---|
| 5,541,238 A * | 7/1996 | Yamada | D01F 11/124 524/439 |
| 8,632,651 B1 | 1/2014 | Hicks et al. | |
| 2007/0006967 A1 | 1/2007 | Sanftleben et al. | |
| 2008/0305329 A1* | 12/2008 | D'Silva | D06M 23/08 65/475 |
| 2010/0104868 A1* | 4/2010 | Lee | B82Y 30/00 427/482 |
| 2014/0023513 A1* | 1/2014 | Johnson | B32B 5/12 428/366 |

FOREIGN PATENT DOCUMENTS

| | | |
|---|---|---|
| JP | H 06166766 A | 6/1994 |
| WO | WO 2016/092293 A1 | 6/2016 |
| WO | WO 2017/101223 A1 | 6/2017 |

OTHER PUBLICATIONS

Jaeschke et al., "Laser processing of continuous carbon fibre reinforced polyphenylene sulphide organic sheets—Correlation of process parameters and reduction in static tensile strength properties," Journal of Thermoplastic Composite Materials, pp. 1-14 (2012).
German Office Action for Application No. 10 2018 214 834.1 dated May 22, 2019.
Kafi et al., "Surface treatment of carbon fibres for interfacial property enhancement in composites via surface deposition of water soluble POSS nanowhiskers", Polymer, vol. 137, pp. 97-106 (Feb. 2018).
British Search Report for Application No. 1912272.0 dated Mar. 11, 2021.
British Search Report for Application No. 1912272.0 dated Feb. 28, 2020.

* cited by examiner

PROCESS FOR NANOSTRUCTURING CARBON FIBERS EMBEDDED IN FRPS BASED ON THE USE OF SULPHUR IN COMBINATION WITH AROMATIC HYDROCARBON GROUPS AND ON THE USE OF LASER RADIATION

CROSS-REFERENCE TO RELATED APPLICATION

This application claims priority to German patent application DE 10 2018 214 834.1 filed Aug. 31, 2018, the entire disclosure of which is incorporated by reference herein.

TECHNICAL FIELD

The disclosure herein provides a process for the nanostructuring of fibers in fiber-composite plastics, where a sulfur-containing nanostructure is formed, and also a plastics matrix with such nanostructured fibers, and also a process for the repair of fibers in a fiber-composite plastic.

BACKGROUND

Processes for the nanostructuring of fibers in fiber-composite plastics are increasingly important for permitting improved bonding to other components.

However, no systematic study of methods for the modification of fibers in fiber-composite plastics has been carried out hitherto.

Processes for the pretreatment of fiber-composite plastics have usually hitherto been based on mechanical ablation, for example grinding, milling, sandblasting, etc., on a surface treatment such as plating, or on surface activation, for example by plasma or laser. However, these processes cannot easily be automated, are dependent on an operator, or merely improve the adhesion of the plastics matrix.

By way of example, J. M. He and Y. D. Huang, "Controlled Interphase in Carbon Fiber/Epoxy Composites by Molecular Self-assembly Method", Key Engineering Materials, 313, pp. 121-128, 2006, DOI: 10-4028/www.scientific.net/KEM.313.121 discloses molecular self-arrangement on carbon fiber surfaces in a composite system by plating.

P. Jaeschke et al., "Laser processing of continuous carbon fibre reinforced polyphenylene sulphide organic sheets—Correlation of process parameters and reduction in static tensile strength properties", Journal of Thermoplastic Composite Materials, 1-14, 2012, DOI: 10.1177/0892705712446016 describes laser damage and the effect thereof on the tensile strength of carbon fiber-reinforced plastics.

SUMMARY

In the light of the above, the disclosure herein is based on the object of providing a process which, through nanostructuring, permits modification of fibers of fiber-composite plastics and can thus achieve improved adhesion to other components as well as within the plastics matrix itself.

The disclosure herein achieves this object via a process for the nanostructuring of a fiber composite plastic, comprising:
providing a fiber-composite plastic comprising a large number of fibers and a plastics matrix comprising at least one sulfur-containing polymer; and
use of radiation for repeated irradiation of the fiber-composite plastic,
where the accumulated energy input due to the radiation is in a range from above 1.2 to below 50 J/cm$^2$, where the energy input due to radiation in a wavelength range of 1000 nm and above does not exceed 2 J/cm$^2$ per pulse.

A process for the nanostructuring of a fiber-composite plastic, comprising:
providing a fiber-composite plastic comprising a large number of fibers and a plastics matrix;
application of at least one sulfur-containing monomer to the plastics matrix; and
use of radiation for repeated irradiation of the at least one sulfur-containing monomer and of the fiber-composite plastic,
where the accumulated energy input due to the radiation is in a range from above 1.2 to below 50 J/cm$^2$, where the energy input due to radiation in a wavelength range of 1000 nm and above does not exceed 2 J/cm$^2$ per pulse, is moreover disclosed.

A fiber-composite plastic produced by a process of the disclosure herein is likewise disclosed.

A further aspect relates to a fiber-composite plastic comprising a large number of fibers and a plastics matrix, where a large number of nanoparticles comprising at least one sulfur-containing polymer and/or one sulfur-containing polymer structure have been bonded to at least one fiber, preferably where the sulfur-containing polymer and/or the sulfur-containing polymer structure takes the form of individual and/or overlapping, at least to some extent globular nanostructures on the fiber.

The disclosure herein is moreover directed to a process for the repair of at least one fiber in a fiber-composite plastic, where the plastics matrix comprises the at least one sulfur-containing polymer, where radiation is used for repeated irradiation of the fiber-composite plastic at least in a region of the at least one fiber, where the accumulated energy input due to the radiation is in a range from above 1.2 to below 50 J/cm$^2$, where the energy input due to radiation in a wavelength range of 1000 nm and above does not exceed 2 J/cm$^2$ per pulse,
and/or
where a sulfur-containing monomer is applied to the plastics matrix at least in a region of the at least one fiber and radiation is used for repeated irradiation of the fiber-composite plastic at least in a region of the at least one fiber, where the accumulated energy input due to the radiation is in a range from above 1.2 to below 50 J/cm$^2$, where the energy input due to radiation in a wavelength range of 1000 nm and above does not exceed 2 J/cm$^2$ per pulse.

The concept underlying the disclosure herein involves use of controlled energy input into the sulfur-containing plastics matrix and/or into at least one sulfur-containing monomer, and/or formation of high bond strengths in the plastics matrix due to the nanostructuring comprising sulfur, for example through sulfur bridges and/or sulfur bonds, where this can lead to improved adhesion in particular of surfaces of the fiber-composite plastic, for example with exposed fibers, or to improved bond strength in a repair of fibers of a damaged fiber-composite plastic. The processes of the disclosure herein can moreover remove contaminants of the fiber-composite plastic, for example on a surface. The plastics matrix can moreover be activated by the energy input and contribute to subsequent bonding to a component.

Advantageous embodiments and further developments are apparent from the disclosure herein, and also from the description with reference to the figures.

The processes disclosed here permit nanostructuring of a fiber-composite plastic, in particular in a region of the surface of the fiber-composite plastic or in a region just below the surface, for example in a region that is below the surface by up to 1 µm, for example up to 500 nm or up to 200 nm, where this can by way of example be dependent on a penetration depth of the incident radiation into the fiber-composite plastic, i.e. by way of example on the energy of the radiation, and also on the absorption of the radiation in the fiber-composite plastic, etc.

The processes of the disclosure herein in particular nanostructure the surface of fibers in the fiber-composite plastic, more preferably of at least to some extent uncovered and/or exposed fibers on the surface of the fiber-composite plastic. There is no particular restriction on the manner here in which the fibers are, or have been, exposed. By way of example, a milling procedure, sandblasting and/or a grinding procedure, etc., can be used to expose the fibers before nanostructuring, these procedures not being subject to any particular restriction.

The material of the fibers here is not subject to any particular restriction, and the fiber-composite plastic can by way of example comprise carbon fibers, glass fibers and/or metal fibers, but the fiber-composite plastic here preferably comprises carbon fibers and in particular comprises in essence only carbon fibers, or comprises only carbon fibers. The fibers, and in particular the carbon fibers, are moreover not subject to any particular restriction in respect of their size; their diameter can by way of example be in the range of 1 to 100 µm, e.g. 2 to 50 µm, for example 5 to 20 µm. In particular, the diameter of the fibers can have an effect on the energy input from the radiation, for example via absorption, and therefore also on the nanostructuring.

The process of the disclosure herein can treat a fiber-composite plastic with or without a matrix based on a sulfur-containing polymer. If the plastics matrix comprises at least one sulfur-containing polymer, this can contribute to the nanostructuring in that the matrix itself adheres to the fiber(s) during the nanostructuring, for example via bonds to sulfur atoms and/or by sulfur bridges. The matrix of the fiber-composite plastic here can also comprise other matrix constituents alongside the at least one sulfur-containing polymer; for example it can also comprise other polymers, and in certain embodiments here only the at least one sulfur-containing polymer serves as polymer of the plastics matrix. The at least one sulfur-containing polymer here is not subject to any particular restriction and in particular comprises at least one organic, in particular thermoplastic polymer. The at least one polymer can by way of example be selected from aliphatic, cyclic and/or aromatic sulfur-containing polymers, for example selected from thioesters, thioethers, etc., in particular from aromatic sulfur-containing polymers such as polyphenylene sulfide (PPS) or analogs thereof, for example based on naphthalene, anthracene, etc., preferably being polyphenylene sulfide. Sulfur-containing copolymers are also, of course, not excluded.

Should the plastics matrix comprise no sulfur-containing polymer, at least one sulfur-containing monomer is applied to the plastics matrix, examples being 1, 2, 3, 4, 5, 6 or more sulfur-containing monomers, in particular one sulfur-containing monomer. During the repeated irradiation, this can become attached to the fibers and form a nanostructure, optionally also with constituents of the plastics matrix. The at least one sulfur-containing monomer here is not subject to any particular restriction and can by way of example be an organic monomer, for example an aliphatic, cyclic and/or aromatic sulfur-containing monomer such as a thiol, thio-ester, thioether, etc., preferably an aliphatic, cyclic and/or aromatic thiol, in particular an aromatic thiol such as thiophenol and/or analogs thereof, for example based on naphthalene, anthracene, etc., preferably being thiophenol. The monomer here can by way of example be applied as liquid and/or in the form of gas.

The disclosure herein does not, of course, exclude application of a sulfur-containing monomer to a fiber-composite plastic where the plastics matrix comprises at least one sulfur-containing polymer. The plastics matrix can, however, also comprise no sulfur-containing polymer, and is not subject to any particular restriction. By way of example, the plastics matrix in such cases can comprise any desired polymer, for example thermosets and/or thermoplastics, e.g. epoxy, it being preferable here in the case of thermosets, however, that there are exposed fibers at least at the surface of the plastics matrix before application of the at least one sulfur-containing monomer.

Radiation is used for repeated irradiation of the fiber-composite plastic in the process of the disclosure herein. The type of radiation here is not subject to any particular restriction, and in particular can provide energy input into the fiber-composite plastic. Radiation used here can by way of example be laser radiation, electron beam, neutron beam, radiation input via a plasma, in particular a cold plasma or atmospheric-pressure plasma, corona discharge, etc., preference being given here however, to laser-irradiation.

The repeated irradiation here can avoid the possibility that excessive energy input takes place during a single irradiation; this can damage the plastics matrix, for example the fibers and/or a polymer of the plastics matrix. The radiation can lead to a chemical reaction and/or a phase transition of the plastics matrix (e.g. sublimation), with possible development of a nanostructure on the fibers. The term nanostructure here means a structure where structuring takes place in a range below 1 µm, where the structuring can be regular or irregular and by way of example can be dependent on the irradiation site.

The accumulated energy input due to the radiation during the irradiation in the disclosure herein is in a range from above 1.2 to below 50 $J/cm^2$, preferably in a range from above 2 to below 45 $J/cm^2$, more preferably in a range from above 3 to below 40 $J/cm^2$, e.g. in a range from above 5 to below 37 $J/cm^2$, for example in a range from above 8 to below 30 $J/cm^2$, where the energy input due to radiation in a wavelength range of 1000 nm and above does not exceed 2 $J/cm^2$ per pulse, in particular 1 $J/cm^2$ per pule, for example 0.5 $J/cm^2$ per pulse. In particular, therefore, irradiation with pulses of IR radiation with corresponding energy should be avoided. The nature of the repeated irradiation itself is not, however, subject to any restriction and can by way of example take the form of pulses which are identical and/or different (in respect of length and/or quantity of energy, etc.). However, the energy input preferably takes place within a sufficiently short period, for example within 10 ms, e.g. within 5 ms, in particular within a period below 1 ms, without dissipation of the energy input from a first irradiation, for example by conductive heat dissipation, etc., before a subsequent irradiation. However, in certain embodiments the time interval between two individual energy inputs, for example pulses, e.g. laser pulses, during repeated irradiation is sufficient to avoid excessive accumulated energy input, being by way of example at least 30 ns, e.g. at least 50 ns.

In the event of excessive accumulated energy input and/or of excessive energy input due to radiation in a wavelength range of 1000 nm and above, there is the possibility of damaged fibers and/or melting of the plastics matrix around the fibers as a result of absorption, and this is therefore avoided in the disclosure herein. If, however, the accumulated energy input is too low, no nanostructure can be developed.

In certain embodiments of repeated irradiation, irradiation takes place at least ten times, for example 20 or more times, e.g. 50 or more times, e.g. 100 or more times, or indeed 300 or more times. The number of irradiation repetitions is by way of example also 10 000 or less, e.g. 5000 or less.

The irradiation site is not subject to any particular restriction. Irradiation can be carried out at points or on areas, with overlaps, etc.

In certain embodiments, the energy input takes place in pulses, for example in the form of laser pulses. In certain embodiments, the energy per pulse of the laser pulses is 0.01 $J/cm^2$ or above, preferably 0.05 $J/cm^2$ or above, more preferably 0.1 $J/cm^2$ or above, and/or 10 $J/cm^2$ or below, preferably 5 $J/cm^2$ or below, more preferably 2 $J/cm^2$ or below, e.g. 1 $J/cm^2$ or below, e.g. 0.5 $J/cm^2$ or below, e.g. 0.12 $J/cm^2$.

In certain embodiments, the irradiation uses radiation in a wavelength range of 100 to 650 nm, preferably 180 to 380 nm. It is thus possible in particular to avoid excessive absorption of the energy by fibers, in particular carbon fibers.

The present processes can be automated in particular by using lasers for the irradiation.

In certain embodiments, the nanostructuring takes place on at least one surface of the fiber-composite plastic, in particular at least on exposed and/or uncovered fibers of the at least one surface. It has in particular been found that during bonding to such surfaces the fibers can make a not inconsiderable contribution to bond strength, and therefore in particular here by virtue of the nanostructuring the fibers can contribute to bonding.

In certain embodiments, the fiber-composite plastic can, after the repeated irradiation, be bonded to another component which is not subject to any particular restriction. The bonding here can take place in a suitable manner, for example via adhesive bonding, welding, fusion, etc.

The processes of the disclosure herein can produce a fiber-composite plastic which has appropriate nanostructuring in particular at fibers on, or close to, an irradiated surface of the fiber-composite plastic. Accordingly, the disclosure herein is also directed to a fiber-composite plastic produced by a process of the disclosure herein.

A fiber-composite plastic is likewise disclosed, comprising a large number of fibers and a plastics matrix, where a large number of nanoparticles comprising at least one sulfur-containing polymer and/or one sulfur-containing polymer structure have been bonded to at least one fiber, preferably where the sulfur-containing polymer and/or the sulfur-containing polymer structure takes the form of individual and/or overlapping, at least to some extent globular nanostructures on the fiber. The location of these is at an irradiated surface and/or in the region of an irradiated surface, for example in a range of up to 1 µm, e.g. up to 500 nm or up to 200 nm, below the surface of the fiber-composite plastic. In certain embodiments, the diameter of at least some of the at least to some extent globular nanostructures, e.g. a proportion of 50% or more, 80% or more or 90% or more, e.g. 95% or more, 99% or more, or indeed 100%, of all of the at least to some extent globular nanostructures, is between 0.5 and 100 nm, preferably between 1 and 80 nm, e.g. between 5 and 60 nm.

The material of the fibers here is not subject to any particular restriction, and the fiber-composite plastic can by way of example comprise carbon fibers, glass fibers and/or metal fibers, but the fiber-composite plastic here preferably comprises carbon fibers and in particular comprises in essence only carbon fibers, or comprises only carbon fibers. The fibers, and in particular the carbon fibers, are moreover not subject to any particular restriction in respect of their size; their diameter can by way of example be in the range of 1 to 100 µm, e.g. 2 to 50 µm, for example 5 to 20 µm.

The plastics matrix of the fiber-composite plastic is not subject to any particular restriction, and preferably comprises at least one polymer, e.g. at least one thermoset and/or one thermoplastic, which is not subject to any particular restriction, e.g. an epoxy and/or at least one sulfur-containing polymer, e.g. PPS and/or an analog thereof based on naphthalene, anthracene, etc. It is also possible, as also in the processes of the disclosure herein, that the plastics matrix has other constituents which can be present in fiber-composite plastics and which are not subject to any particular restriction.

A process for the repair of at least one fiber in a fiber-composite plastic is moreover disclosed, where the plastics matrix comprises the at least one sulfur-containing polymer, where radiation is used for repeated irradiation of the fiber-composite plastic at least in a region of the at least one fiber, where the accumulated energy input due to the radiation is in a range from above 1.2 to below 50 $J/cm^2$, where the energy input due to radiation in a wavelength range of 1000 nm and above does not exceed 2 $J/cm^2$ per pulse, and/or where a sulfur-containing monomer is applied to the plastics matrix at least in a region of the at least one fiber and radiation is used for repeated irradiation of the fiber-composite plastic at least in a region of the at least one fiber, where the accumulated energy input due to the radiation is in a range from above 1.2 to below 50 $J/cm^2$, where the energy input due to radiation in a wavelength range of 1000 nm and above does not exceed 2 $J/cm^2$ per pulse. This process can by way of example rebond to the plastics matrix fibers which have separated to some extent; these can arise by way of example during mechanical treatment such as grinding, milling, sandblasting, etc.

The individual steps and constituents here, for example the fiber-composite plastic, the plastics matrix, the fibers, the radiation, etc. correspond to those relating to the other processes of the disclosure herein described above, and reference is therefore made here to the corresponding descriptions above.

The above embodiments and further developments can be combined with one another in any desired manner whenever it is useful to do so. Other possible embodiments, further developments and ways of implementing the disclosure herein also comprise combinations not explicitly specified of features of the disclosure herein that are described above or below in relation to the implementation examples. In particular here, the person skilled in the art will also add, to the respective basic form of the disclosure herein, individual aspects in the form of improvements or additions.

BRIEF DESCRIPTION OF THE DRAWINGS

The disclosure herein is explained in more detail below with reference to the inventive examples provided in the figures, which show.

DETAILED DESCRIPTION

The attached figures are intended to increase understanding of the embodiments of the disclosure herein. They illustrate embodiments, and serve in conjunction with the description to explain principles and concepts of the disclosure herein. Other embodiments, and many of the advantages mentioned, are apparent from study of the drawings.

Inventive Example 1 and Comparative Example 1

In an example of a process of the disclosure herein, a fiber-composite plastic with a matrix of polyphenylene sulfide and with exposed carbon fibers was irradiated with 300 pulses in inventive example 1 by a UV laser with energy 0.12 J/cm$^2$ per pulse and pulse duration 20 ns in a region of exposed fibers. In comparative example 1, a fiber-composite plastic with an epoxy matrix with exposed carbon fibers was irradiated in the same manner.

Figure 1:
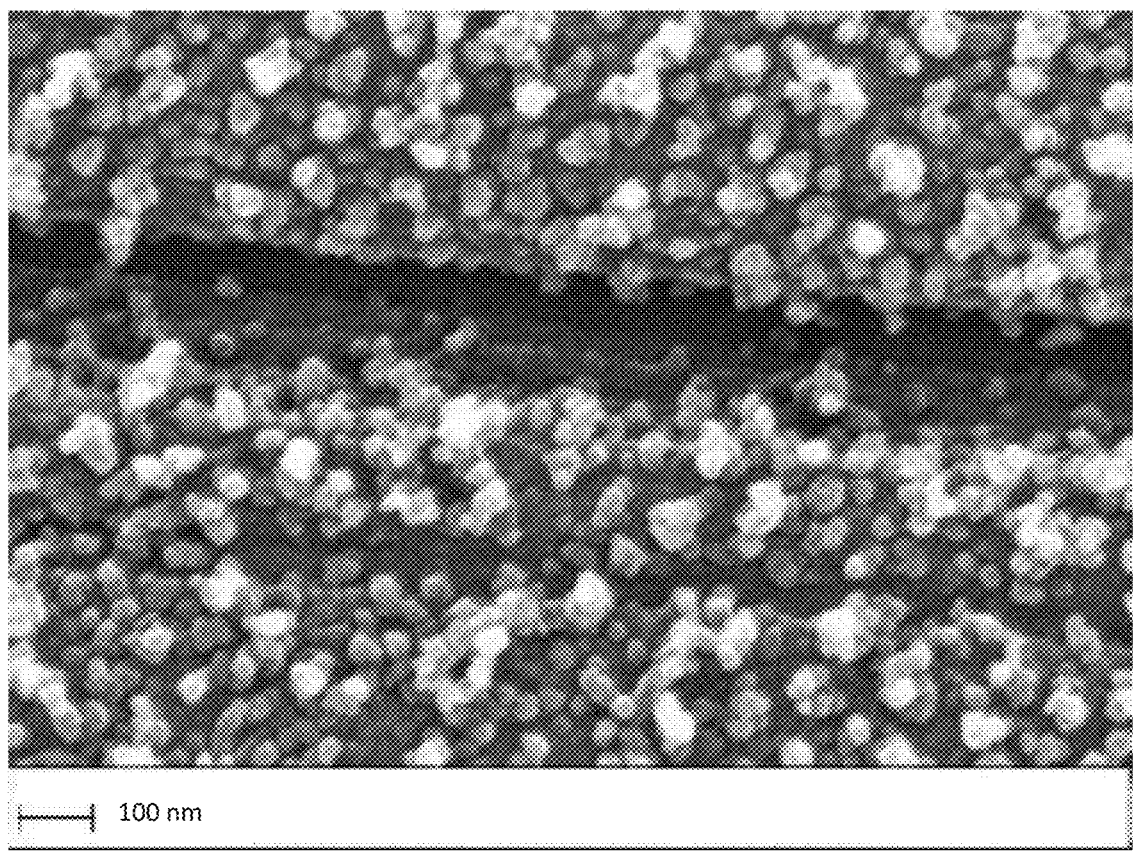
In FIGS. 1-8, micrographs of modified fibers in inventive examples and comparative examples of the disclosure herein.
Figure 2:
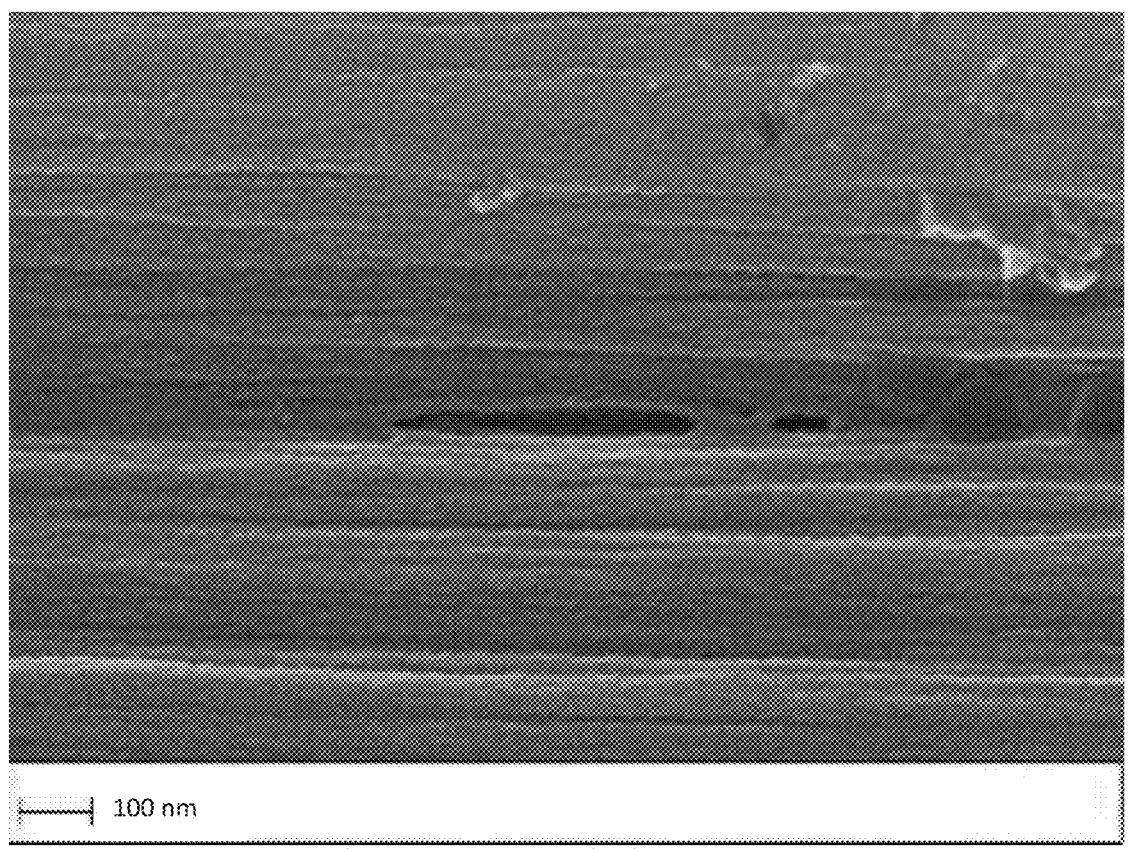

FIG. 1 shows a micrograph of irradiated fibers after the irradiation in inventive example 1, and FIG. 2 shows a micrograph of irradiated fibers after irradiation in comparative example 1. As can be seen from the figures, a to some extent globular nanostructure produced from the matrix material becomes attached to the fibers in inventive example 1 as a result of the irradiation of the sulfur-containing matrix.

Figure 3:
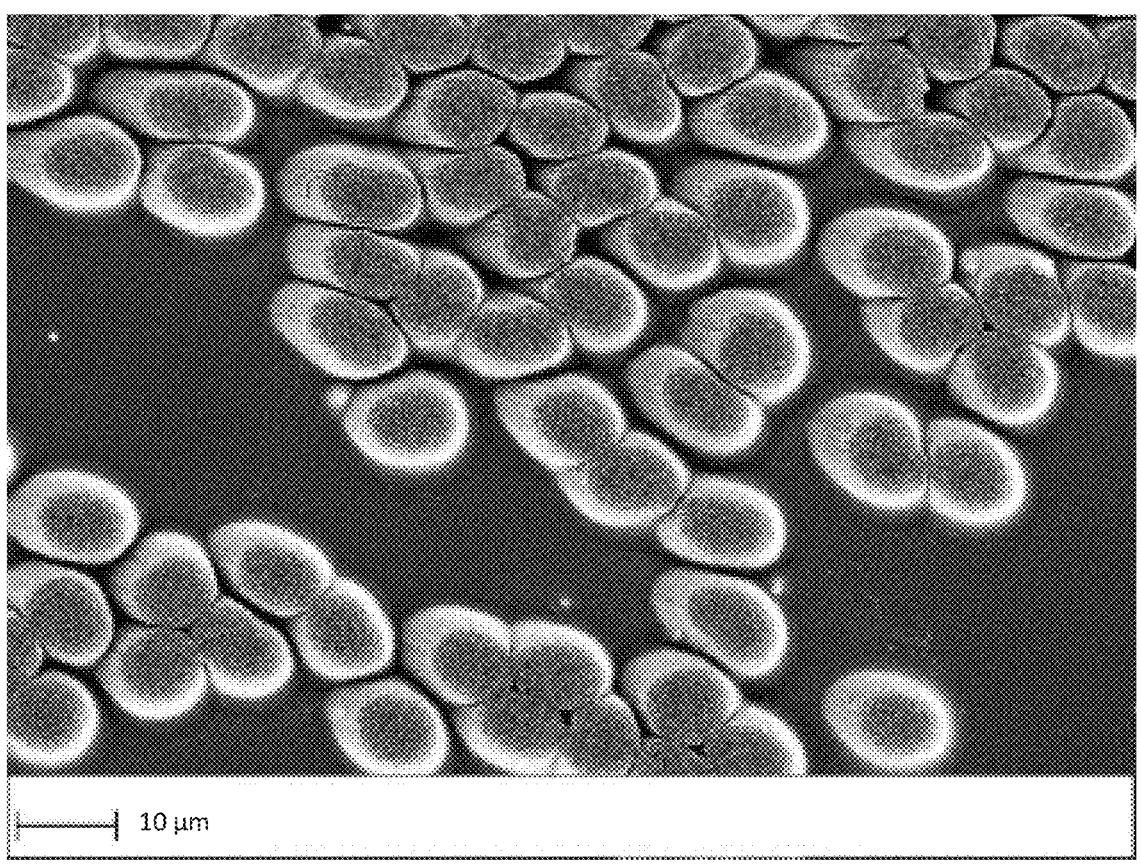
Figure 4:
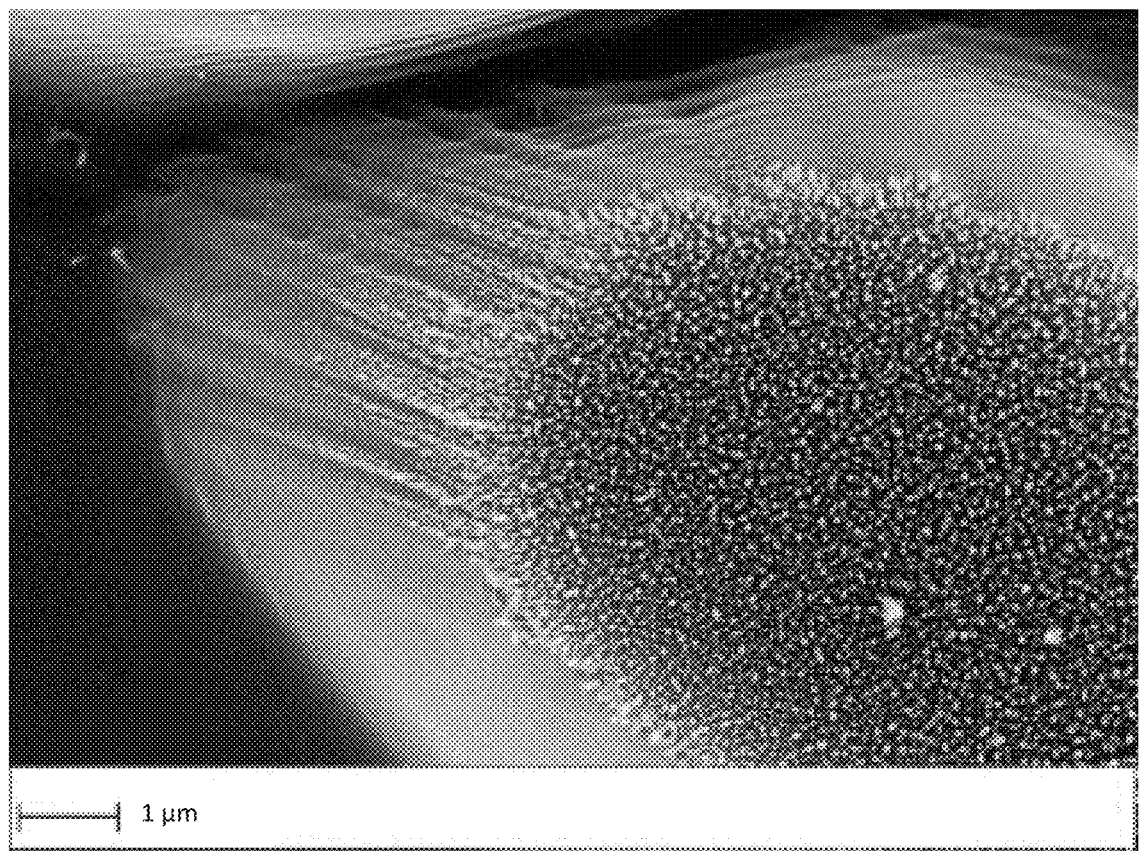

This nanostructuring on the fibers can also be seen clearly in the cross-sectional depictions in FIGS. 3 and 4.

Inventive Example 2 and Comparative Example 2

Figure 5:
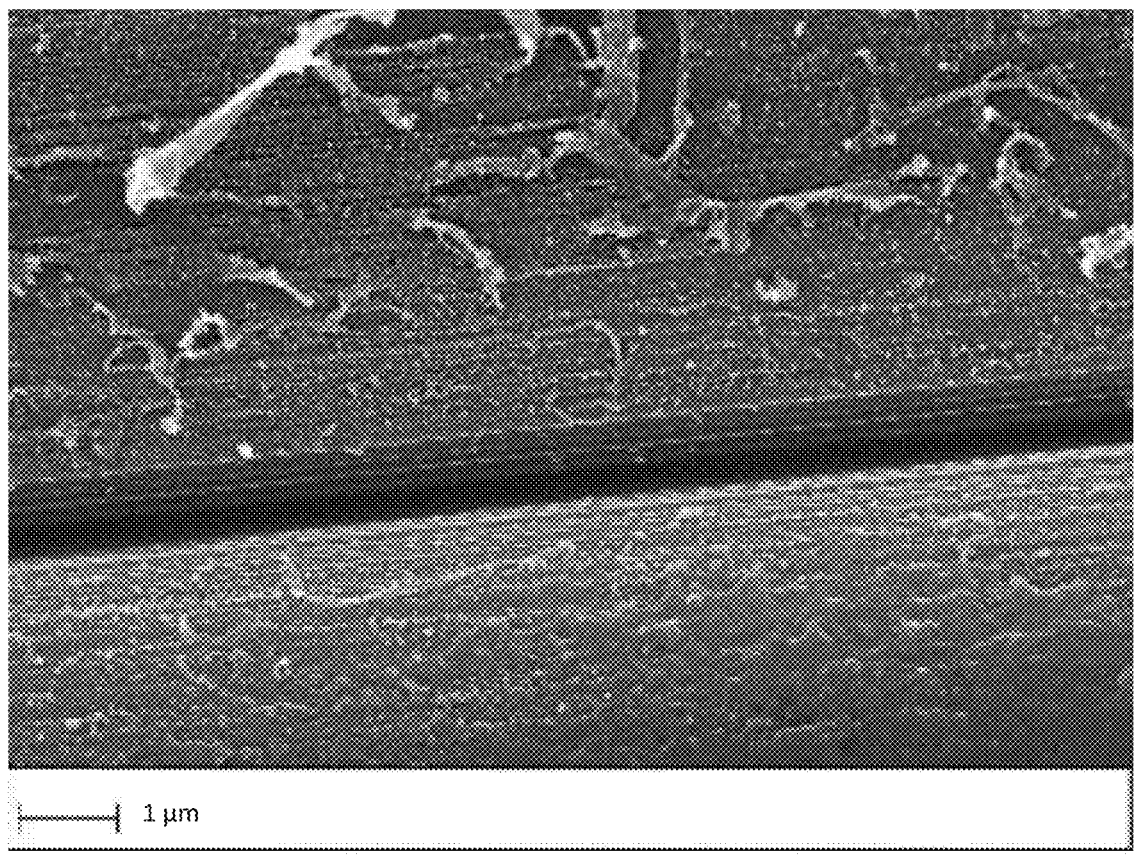

The process carried out in inventive example 2 was as in inventive example 1, except that irradiation was carried out with 100 pulses (accumulated 12 J/cm$^2$). Comparison with inventive example 1 reveals a moderate nanostructure, as can be seen in FIG. 5.

Figure 6:
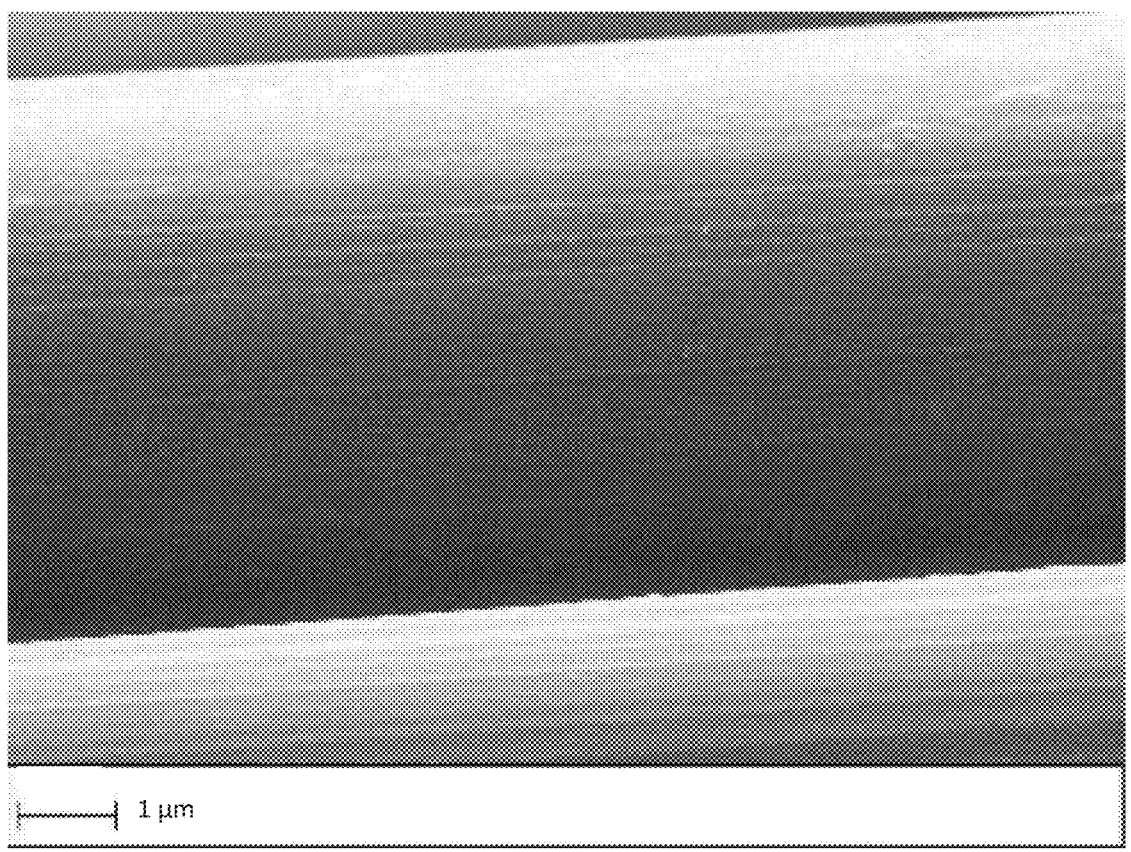

The process carried out in comparative example 2 was as in inventive example 1, except that irradiation was carried out with 10 pulses (accumulated 1.2 J/cm$^2$). No nanostructure is obtained here, as can be seen in FIG. 6.

Inventive Example 3 and Comparative Example 3

Figure 7:
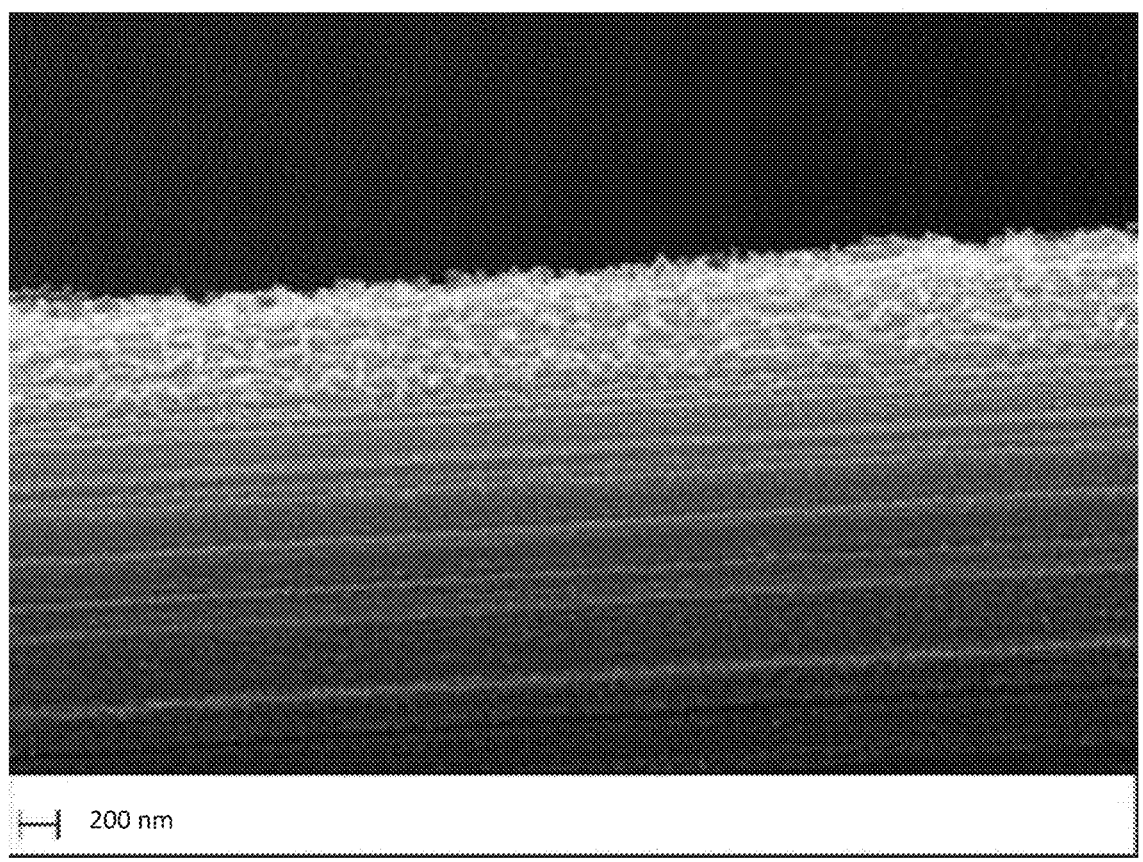

The process carried out in inventive example 3 was as in inventive example 1, except that irradiation was carried out with 300 pulses (accumulated 26 J/cm$^2$) and that the irradiation used an IR laser with wavelength 1064 nm. Comparison with inventive example 1 reveals a slight nanostructure, as can be seen in FIG. 7.

Figure 8:
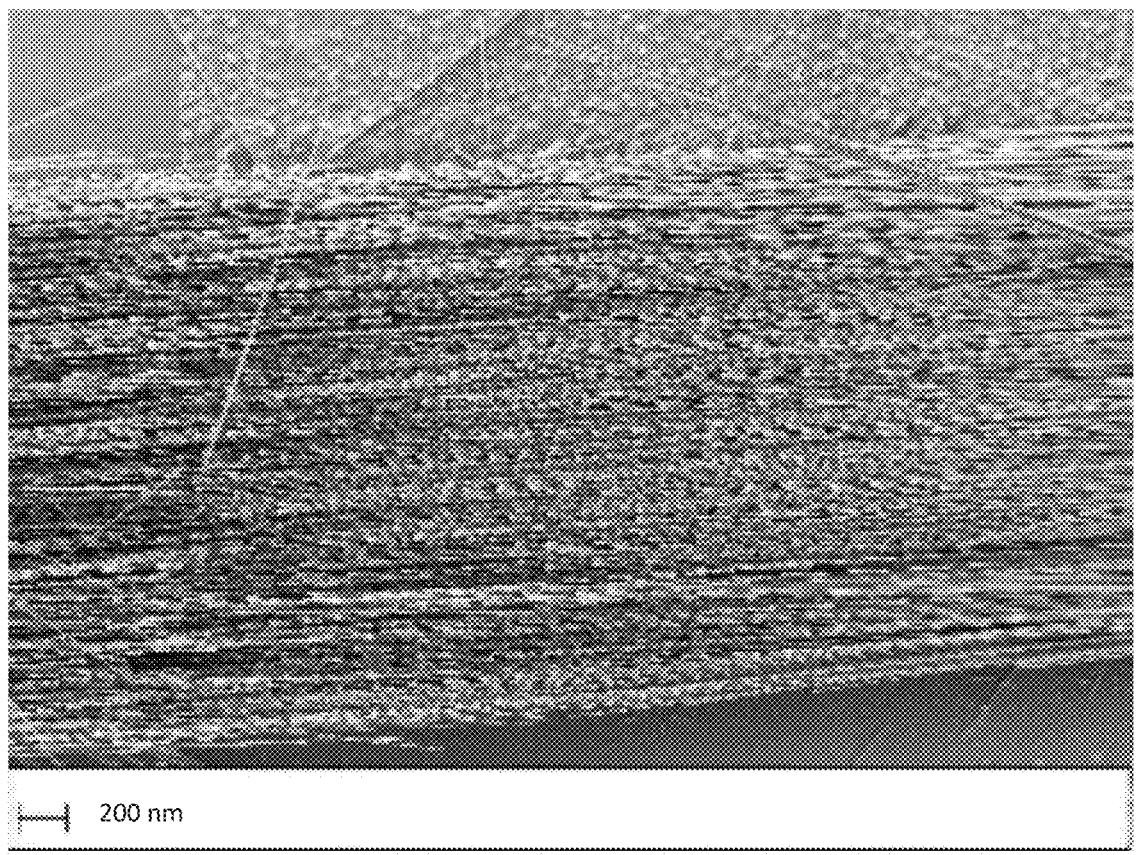

Comparative example 3 corresponds to inventive example 3, except that the irradiation was carried out with 1 pulse of 27 J/cm$^2$. Comparison with inventive example 3 clearly reveals fiber damage, as can be seen in FIG. 8.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A process for nanostructuring of a fiber-composite plastic, comprising:
    providing a fiber-composite plastic comprising fibers and a plastics matrix comprising at least one sulfur-containing polymer; and
    using pulsed radiation for repeated irradiation of the fiber-composite plastic,
    where accumulated energy input due to the radiation is in a range from above 1.2 to below 50 J/cm$^2$, and where energy input due to radiation in a wavelength range of 1000 nm and above does not exceed 2 J/cm$^2$ per pulse.

2. The process as claimed in claim 1, where the irradiation uses radiation in a wavelength range of 100 to 650 nm.

3. The process as claimed in claim 1, where the nanostructuring takes place on at least one surface of the fiber-composite plastic.

4. The process as claimed in claim 1, where the fibers are selected from the group consisting of carbon fibers, glass fibers and metal fibers.

5. The process as claimed in claim 1, where the nanostructuring takes place on exposed fibers, where, before the nanostructuring, the fibers are exposed by a milling procedure, sandblasting and/or a grinding procedure.

6. A process for nanostructuring of a fiber-composite plastic, comprising:
    providing a fiber-composite plastic comprising fibers and a plastics matrix;
    applying at least one sulfur-containing monomer to the plastics matrix; and
    using pulsed radiation for repeated irradiation of the at least one sulfur-containing monomer and of the fiber-composite plastic,
    where accumulated energy input due to the radiation is in a range from above 1.2 to below 50 J/cm$^2$, and where energy input due to radiation in a wavelength range of 1000 nm and above does not exceed 2 J/cm$^2$ per pulse.

7. A process for repair of at least one fiber in a fiber-composite plastic, where a plastics matrix comprises at least one sulfur-containing polymer, where pulsed radiation is used for repeated irradiation of the fiber-composite plastic at least in a region of the at least one fiber, where accumulated energy input due to the radiation is in a range from above 1.2 to below 50 J/cm$^2$, and where energy input due to radiation in a wavelength range of 1000 nm and above does not exceed 2 J/cm$^2$ per pulse,
    and/or
    where a sulfur-containing monomer is applied to the plastics matrix at least in a region of the at least one fiber and pulsed radiation is used for repeated irradiation of the fiber-composite plastic at least in a region of the at least one fiber, where accumulated energy input due to the radiation is in a range from above 1.2 to below 50 J/cm$^2$, and where energy input due to radiation in a wavelength range of 1000 nm and above does not exceed 2 J/cm$^2$ per pulse.

* * * * *